United States Patent
Bondich et al.

(10) Patent No.: US 12,190,422 B2
(45) Date of Patent: *Jan. 7, 2025

(54) HAIR STYLES SYSTEM FOR RENDERING HAIR STRANDS BASED ON HAIR SPLINE DATA

(71) Applicant: Snap Inc., Santa Monica, CA (US)

(72) Inventors: Artem Bondich, Marina del Rey, CA (US); Oleksandr Pyshchenko, Pacific Palisades, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/206,985

(22) Filed: Jun. 7, 2023

(65) Prior Publication Data

US 2023/0316613 A1  Oct. 5, 2023

Related U.S. Application Data

(63) Continuation of application No. 17/313,388, filed on May 6, 2021, now Pat. No. 11,741,647, which is a
(Continued)

(51) Int. Cl.
*G06T 11/60* (2006.01)
*G06T 5/70* (2024.01)
(Continued)

(52) U.S. Cl.
CPC .......... *G06T 11/60* (2013.01); *G06T 5/70* (2024.01); *G06T 11/001* (2013.01);
(Continued)

(58) Field of Classification Search
CPC ......... G06T 11/60; G06T 5/70; G06T 11/001; G06T 11/203
See application file for complete search history.

(56) References Cited

U.S. PATENT DOCUMENTS

| 11,030,786 B1 | 6/2021 | Bondich et al. |
| 11,741,647 B2 | 8/2023 | Bondich et al. |
| (Continued) | | |

OTHER PUBLICATIONS

Mathieu Le Muzic, Real-Time Hair Simulation and Rendering with OpenCL and OpenGL, Computer Science, Engineering (Year: 2012).*
(Continued)

*Primary Examiner* — Weiming He
(74) *Attorney, Agent, or Firm* — Schwegman Lundberg & Woessner, P.A.

(57) ABSTRACT

Systems and methods are provided for rendering hair. The systems and methods include receiving hair spline data comprising coordinates of a plurality of hair strands; selecting a first hair strand of the plurality of hair strands; retrieving coordinates of the first hair strand; identifying based on the respective coordinates of the plurality of hair strands a second hair strand that is adjacent to the first hair strand; storing a reference to the second hair strand in association with the coordinates of the first hair strand; and generating one or more additional hair strands between the first hair strand and the second hair strand based on the coordinates of the first hair strand and the reference to the second hair strand.

20 Claims, 12 Drawing Sheets

Related U.S. Application Data continuation of application No. 16/532,221, filed on Aug. 5, 2019, now Pat. No. 11,030,786.

(51) Int. Cl.
  *G06T 11/00* (2006.01)
  *G06T 11/20* (2006.01)
(52) U.S. Cl.
  CPC ........ *G06T 11/203* (2013.01); *G06T 2200/24* (2013.01); *G06T 2207/10016* (2013.01); *G06T 2207/30201* (2013.01)

(56) References Cited

U.S. PATENT DOCUMENTS

| | | | |
|---|---|---|---|
| 2005/0243088 A1 | 11/2005 | Lengyel | |
| 2008/0170069 A1* | 7/2008 | Gibbs | G06T 17/30 345/419 |
| 2010/0123908 A1 | 5/2010 | Denoue et al. | |
| 2014/0337753 A1* | 11/2014 | McKellar | G06F 9/451 715/747 |
| 2020/0219327 A1 | 7/2020 | Khadiyev | |
| 2021/0256750 A1 | 8/2021 | Bondich et al. | |

OTHER PUBLICATIONS

U.S. Appl. No. 16/532,221 U.S. Pat. No. 11,030,786, filed Aug. 5, 2019, Hair Styles System for Rendering Hair Strands Based on Hair Spline Data.

U.S. Appl. No. 17/313,388, filed May 6, 2021, Hair Styles System for Rendering Hair Strands Based on Hair Spline Data.

"U.S. Appl. No. 16/532,221, Non Final Office Action mailed Oct. 15, 2020", 12 pgs.

"U.S. Appl. No. 16/532,221, Notice of Allowance mailed Feb. 10, 2021".

"U.S. Appl. No. 16/532,221, Response filed Jan. 15, 2021 to Non Final Office Action mailed Oct. 15, 2020", 11 pgs.

"U.S. Appl. No. 17/313,388, Non Final Office Action mailed Dec. 2, 2022", 7 pgs.

"U.S. Appl. No. 17/313,388, Notice of Allowance mailed Mar. 9, 2023", 7 pgs.

"U.S. Appl. No. 17/313,388, Response filed Feb. 28, 2023 to Non Final Office Action mailed Dec. 2, 2022", 9 pgs.

"U.S. Appl. No. 17/313,388, Corrected Notice of Allowability mailed Jul. 6, 2023", 2 pgs.

* cited by examiner

HAIR STYLES SYSTEM FOR RENDERING HAIR STRANDS BASED ON HAIR SPLINE DATA

CLAIM OF PRIORITY

This application is a continuation of U.S. patent application Ser. No. 17/313,388, filed on May 6, 2021, which is a continuation of U.S. patent application Ser. No. 16/532,221, filed on Aug. 5, 2019, each of which is incorporated herein by reference in its entirety.

TECHNICAL FIELD

The present disclosure relates generally to hair simulation and rendering.

BACKGROUND

Modern day user devices enable users to graphically enhance and modify images of objects depicted in a video stream or images. For example, users can add makeup and change various attributes of a face depicted in an image or video. After making the enhancements or modifications, the modified video stream or images can be shared with other users over a social network.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
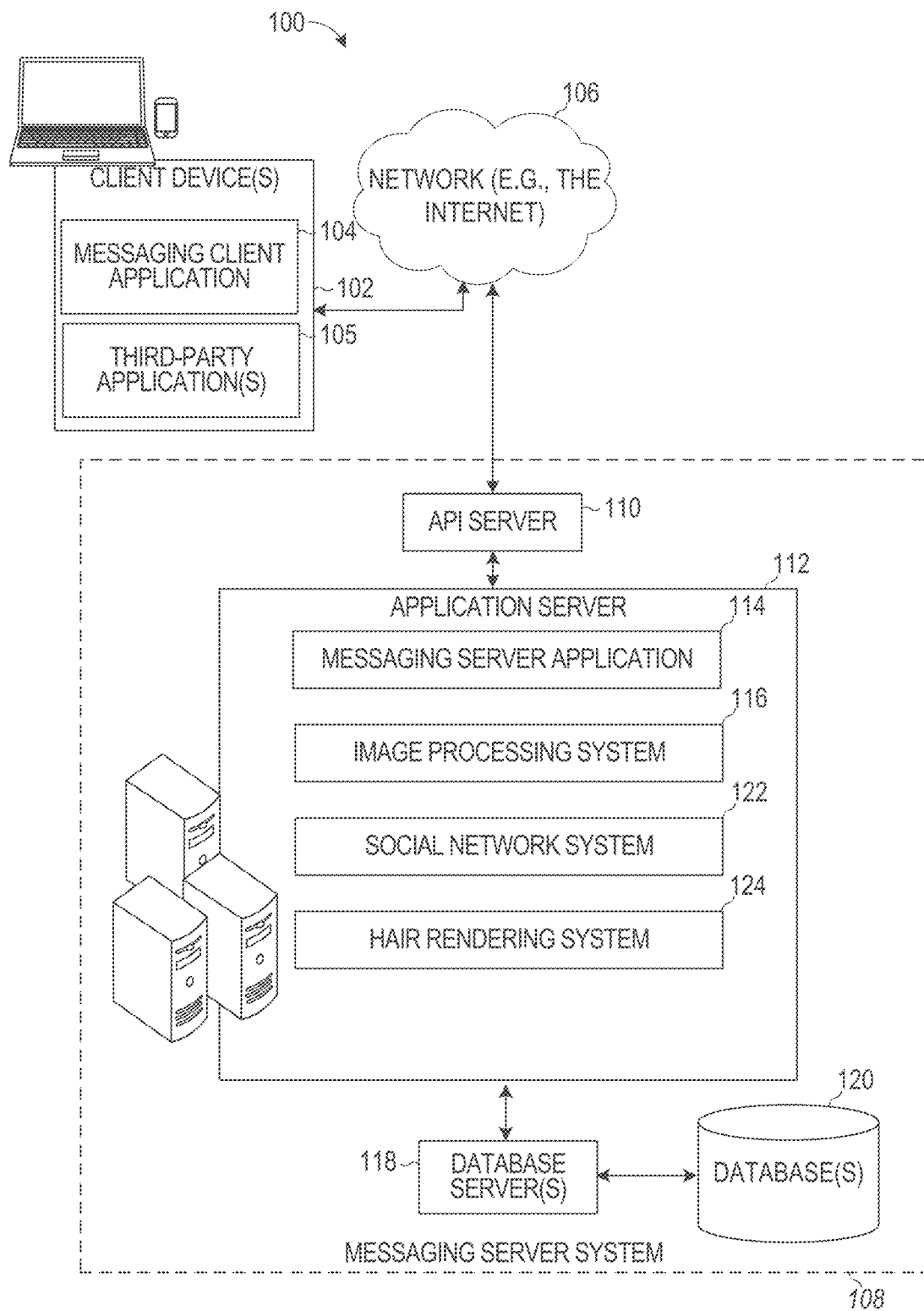
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Typical systems allow users to enhance and modify objects, such as faces, depicted in images. The number and types of modifications made available to users continue to grow in complexity. More complex modifications place heavier burdens on the underlying resources, which take away processing power from other applications that run on the devices and drain power resources at a rapid pace. This is especially a concern when such complex image modification techniques are implemented and used on mobile devices where power and processing resources are limited. In such cases, users try to avoid degrading performance of applications running on their devices and draining the power resources, such as batteries. As a result, complex image modification features may end up not being used and waste resources.

The disclosed embodiments improve the efficiency of using the electronic device by providing a hair rendering system that provides a user with the option of enhancing and modifying hair of an object, such as hair on a user's head depicted in an image or video frames. The disclosed embodiments enable the user to enhance and modify hair of the object on mobile devices in real-time in an efficient manner that does not degrade processing or battery resources of the mobile device. To do so, the disclosed embodiments process received hair spline data to generate and simulate additional hair strands between two or more neighboring hair strands. To reduce the storage and processing requirements, according to some embodiments, positions of the neighboring hair strands are stored as indices in association with a given hair strand. For example, a float texture file that includes red, green, blue, and alpha channels for each hair strand is generated, where the red, green and blue channels store coordinates of a given hair strand and the alpha channel stores one or more indices of (or one or more references to) one or more neighboring hair strands. Specifically, the float texture file may include a plurality of sections that include red, green, blue and alpha channels, each section being associated with a difference hair strand. Each section of the plurality of sections includes coordinates of the given hair strand stored in the red, green and blue channels and optionally one or more references to one or more other sections that store coordinates of other hair strands. The float texture file is then processed to generate and simulate additional hair strands to enhance the realistic effect of a hair model.

Specifically, according to the disclosed embodiments, hair spline data is received that includes coordinates of a plurality of hair strands. The disclosed techniques automatically generate additional hair strands in an efficient manner by selecting a first hair strand of the plurality of hair strands; retrieving coordinates of the first hair strand; searching coordinates of the plurality of hair strands, based on the coordinates of the first hair strand, to identify a second hair strand of the plurality of hair strands that is adjacent to the first hair strand; and storing an index of or reference to the second hair strand in association the coordinates of the first hair strand. After the additional hair strands are generated, a hair model is rendered in multiple phases with a realistic effect.

FIG. 1 is a block diagram showing an example messaging system 100 for exchanging data (e.g., messages and associated content) over a network 106. The messaging system 100 includes multiple client devices 102, each of which hosts a number of applications, including a messaging client application 104 and a third-party application 105. Each messaging client application 104 is communicatively coupled to other instances of the messaging client application 104, the third-party application 105, and a messaging server system 108 via a network 106 (e.g., the Internet).

Accordingly, each messaging client application 104 and third-party application 105 is able to communicate and exchange data with another messaging client application 104 and third-party application(s) 105 and with the messaging server system 108 via the network 106. The data exchanged between messaging client applications 104, third-party applications 105, and the messaging server system 108 includes functions (e.g., commands to invoke functions) and payload data (e.g., text, audio, video, or other multimedia data). Any disclosed communications between the messaging client application 104 and the third-party application(s) 105 can be transmitted directly from the messaging client application 104 to the third-party application(s) 105 and/or indirectly (e.g., via one or more servers) from the messaging client application 104 to the third-party application(s) 105.

The third-party application(s) 105 and the messaging client application 104 are applications that include a set of functions that allow the client device 102 to access a hair rendering system 124. The third-party application 105 is an application that is separate and distinct from the messaging client application 104. The third-party application(s) 105 are downloaded and installed by the client device 102 separately from the messaging client application 104. In some implementations, the third-party application(s) 105 are downloaded and installed by the client device 102 before or after the messaging client application 104 is downloaded and installed. The third-party application 105 is an application that is provided by an entity or organization that is different from the entity or organization that provides the messaging client application 104. The third-party application 105 is an application that can be accessed by a client device 102 using separate login credentials than the messaging client application 104. Namely, the third-party application 105 can maintain a first user account and the messaging client application 104 can maintain a second user account. For example, the third-party application 105 can be a social networking application, a dating application, a ride or car sharing application, a shopping application, a trading application, a gaming application, or an imaging application.

In some embodiments, the messaging client application 104 presents a graphical user interface to a user that allows the user to manipulate, modify and/or enhance features of an object, such as the user's face, depicted in an image or video stream. As an example, the graphical user interface may present a video depicting the user's face. The user can select a hair style from a list of hair styles presented to the user. In response to receiving the user selection of the hair style, the video depicting the user's face is modified to replace or overlay the hair portion on top of the user's head with the selected hair style. In some implementations, the hair style is dynamically adapted and modeled by the hair rendering system 124. As the user moves their head around in the video in real-time, the hair rendering system 124 updates and simulates the selected hair style to appear to move in a realistic manner. Each hair strand in the selected hair style is updated to move as the user moves their head, and the updated hair style is displayed in the video stream depicting the user's face.

In an embodiment, the hair rendering system 124 includes functions for simulating each of the different hair styles under different environmental conditions (e.g., different movements of the user's head, wind strength, smoothness of the hair, etc.). In an embodiment, the user can input criteria for controlling how different portions of the hair and/or the hair in its entirety is simulated.

In some embodiments, the modeling of the selected hair style in the video stream depicting the user's face can be based on resource capabilities of the user device on which the messaging client application 104 is running. For example, the hair rendering system 124 may determine whether the user device satisfies certain minimum processing capabilities (e.g., whether the user device has access to a graphics library with a first set of functions). If the user device does satisfy the minimum processing capabilities, then the selected hair style is modeled in real-time and each hair strand or group of hair strands is modeled and updated individually to provide a realistic effect of the hair moving when subjected to movement of the user's head or certain environmental conditions. If the user device does not satisfy the minimum processing capabilities, then the selected hair style is presented in the video stream depicting the user face in a static manner. In such cases, the hair geometry including all of the hair strands may be modeled in the same way and may appear to have less realistic movement when subjected to movement of the user's head or certain environmental conditions.

Environmental conditions can include any environmental condition that is sensed by the user device and/or that is input by the user. For example, the environmental conditions can include any combination of wind influence on hair, hair collisions as hair moves, stiffness of the hair indicating a level of how hard each strand of hair is to stretch where smaller values indicate softer hair, bend factor indicating how hard each strand is to bend, twist factor indicating how hard each strand is to twist, collapse factor indicating how hard each strand is to collapse, air friction factor indicating how fast the motion is to decay to zero, where smaller motion causes the hair to settle faster or slower, gravity factor, wind force factor, etc.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, virtual objects, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an API server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server 110 receives and transmits message data (e.g., commands and message payloads) between the client device 102 and the application server 112. Specifically, the API server 110 provides a set of interfaces (e.g., routines and protocols) that can be called or queried by the messaging client application 104 and the third-party application 105 in order to invoke functionality of the application server 112. The API server 110 exposes various functions supported by the application server 112, including account registration; login functionality, the sending of messages, via the application server 112, from a particular messaging client application 104 to another messaging client application 104 or third-party application 105; the sending of media files (e.g., images or video) from a messaging client application 104 to the messaging server application 114, and for possible access by another messaging client application 104 or third-party application 105; the setting of a collection of media data (e.g., story); the retrieval of such collections; the retrieval of a list of friends of a user of a client device 102; the retrieval of messages and content; the adding and deleting of friends to a social graph; the location of friends within a social graph; access to user conversation data; access to avatar information stored on messaging server system 108; and opening an application event (e.g., relating to the messaging client application 104).

The application server 112 hosts a number of applications and subsystems, including a messaging server application 114, an image processing system 116, a social network system 122, and the hair rendering system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114. A portion of the image processing system 116 may also be implemented by the hair rendering system 124.

The social network system 122 supports various social networking functions and services and makes these functions and services available to the messaging server application 114. To this end, the social network system 122 maintains and accesses an entity graph within the database 120. Examples of functions and services supported by the social network system 122 include the identification of other users of the messaging system 100 with which a particular user has relationships or is "following" and also the identification of other entities and interests of a particular user. Such other users may be referred to as the user's friends. Social network system 122 may access location information associated with each of the user's friends to determine where they live or are currently located geographically. Social network system 122 may maintain a location profile for each of the user's friends indicating the geographical location where the user's friends live.

The hair rendering system 124 generates hair model simulations for various hair styles. To do so, the hair rendering system 124 receives input of a hair spline data file that includes coordinates of a plurality of hair strands. The hair rendering system 124 processes the hair strands in the hair spline data file to identify neighbor hair strands for each of the plurality of hair strands. In some cases, the hair rendering system 124 applies a nearest to current neighbor approach to identify neighboring hair strands for each hair strand. In some cases, the hair rendering system 124 applies a nearest to next neighbor approach to identify neighboring hair strands. In either case, a maximum of two neighbor hair strands is identified for each hair strand. The hair rendering system 124 updates the hair spline data file to input the indices of (or references to) the identified neighbors of each hair strand. In some embodiments, the hair rendering system 124 continuously updates the hair spline data file for each frame of a video in which the hair style is selected to be used to modify or enhance an objected depicted in the video.

In some cases, the hair rendering system 124 also considers whether an angle formed between the two adjacent hair strands (e.g., a given hair strand and a neighbor hair strand) is less than a threshold. The hair rendering system 124 conditions whether a particular hair strand can be indexed as a neighbor hair strand to a given hair strand based on the angle that is formed between the two adjacent hair strands. For example, the hair rendering system 124 may determine that the given hair strand is closest in distance to a neighbor hair strand. If the angle formed between the given hair strand and the neighbor hair strand is less than the threshold, the two hair strands can be indexed as or referenced as neighbors. If the angle formed between the given hair strand and the neighbor hair strand exceeds the threshold, then the neighbor hair strand is prevented from being indexed with the given hair strand.

In some implementations, the hair rendering system 124 generates additional hair strands between each hair strand that is in the hair spline data file and the corresponding one or two neighbors. To generate the additional hair strands, the hair rendering system 124 applies single strand or multi-strand interpolation between two hair strands. In some cases, the hair rendering system 124 employs multi-strand interpolation between each given hair strand and its corresponding one or two neighbor hair strands to generate the additional hair strands. In some cases, a given hair strand is not associated with another hair strand, and in such circumstances, the hair rendering system 124 employs the single strand interpolation to generate the additional hair strands.

In some embodiments, after the additional hair strands are generated, the hair rendering system 124 renders a model of the hair style based on the hair spline data file and the additional hair strands that are generated. In particular, the hair rendering system 124 renders a display of hair using the hair spline data in three passes for each video frame that depicts a user's face. In a first pass of the three passes: a geometry of the hair is generated using the hair spline data and the additional hair strands; strand tangent directions are computed and stored in a red and green channel for each hair strand of the plurality of hair strands and the additional hair strands that have been generated; hair color luminance is stored in a blue channel for each hair strand of the plurality of hair strands and the additional hair strands that have been generated; and a one bit transparency is stored in an alpha channel for each hair strand of the plurality of hair strands and the additional hair strands that have been generated. In a second pass of the three passes, a screen quad is rendered based on the geometry, the blue channel, and the alpha channel. In a third pass of the three passes, a one-dimensional Gaussian blur is performed on the screen quad along the strand tangent directions stored in the red and green channels.

In some embodiments, after the additional hair strands are generated, the hair rendering system 124 renders a model of the hair style based on the hair spline data file and the additional hair strands that are generated. In particular, the hair rendering system 124 renders a display of hair using the hair spline data in four passes for each video frame. In a first pass of the four passes: a geometry of the hair is generated using the hair spline data and the additional hair strands; and an alpha color mask with additive blending is stored in an alpha channel for each hair strand of the plurality of hair strands and the additional hair strands that have been generated. In a second pass of the four passes: strand tangent directions are computed and stored in a red and green channel for each hair strand of the plurality of hair strands and the additional hair strands that have been generated; and hair color luminance is stored in a blue channel for each hair strand of the plurality of hair strands and the additional hair strands that have been generated. In a third pass of the four passes, a screen quad is rendered based on the geometry, the blue channel, and the alpha channel. In a fourth pass of the four passes, a one-dimensional Gaussian blur is performed on the screen quad along the strand tangent directions stored in the red and green channels.

The application server 112 is communicatively coupled to a database server 118, which facilitates access to a database 120 in which is stored data associated with messages processed by the messaging server application 114. Database 120 may be a third-party database. For example, the application server 112 may be associated with a first entity, and the database 120 or a portion of the database 120 may be associated and hosted by a second different entity. In some implementations, database 120 stores user data that the first entity collects about various each of the users of a service provided by the first entity. For example, the user data includes user names, passwords, addresses, friends, activity information, preferences, videos or content consumed by the user, and so forth.

Figure 2:
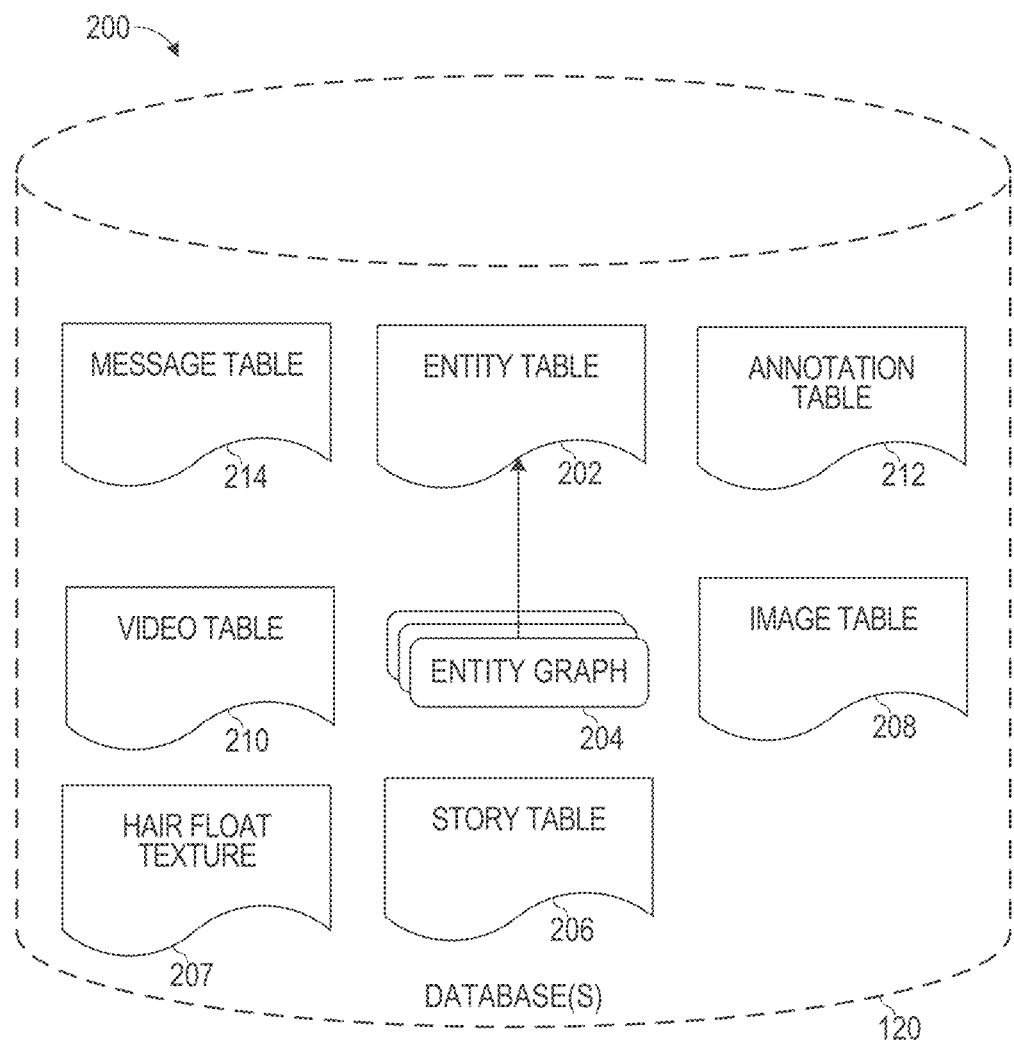
FIG. 2 is a schematic diagram illustrating data which may be stored in the database of a messaging server system, according to example embodiments.

FIG. 2 is a schematic diagram 200 illustrating data, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 214. An entity table 202 stores entity data, including an entity graph 204. Entities for which records are maintained within the entity table 202 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 204 stores information regarding relationships and associations between entities. Such relationships may be social, professional (e.g., work at a common corporation or organization), interest-based, or activity-based, merely for example.

Message table 214 may store a collection of conversations between a user and one or more friends or entities. Message table 214 may include various attributes of each conversation, such as the list of participants, the size of the conversation (e.g., number of users and/or number of messages), the chat color of the conversation, a unique identifier for the conversation, and any other conversation related feature(s).

The database 120 also stores annotation data, in the example form of filters, in an annotation table 212. Database 120 also stores annotated content received in the annotation table 212. Filters for which data is stored within the annotation table 212 are associated with and applied to videos (for which data is stored in a video table 210) and/or images (for which data is stored in an image table 208). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a UI by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

Other annotation data that may be stored within the image table 208 is so-called "lens" data. A "lens" may be a real-time special effect and sound that may be added to an image or a video.

As mentioned above, the video table 210 stores video data which, in one embodiment, is associated with messages for which records are maintained within the message table 214. Similarly, the image table 208 stores image data associated with messages for which message data is stored in the entity table 202. The entity table 202 may associate various annotations from the annotation table 212 with various images and videos stored in the image table 208 and the video table 210.

Hair float texture 207 stores the hair spline data file for each hair style and/or for each frame of a video. The hair float texture 207 stores data in floating point representation rather than integer representation. As an example, the hair float texture 207 for one frame may include a red channel, a green channel, a blue channel, and an alpha channel for each of the plurality of hair strands. Three-dimensional coordinates (x-axis, y-axis, and z-axis) of each hair strand along a spline are stored in the red, green and blue channels of the hair strand. The indices of or references to one or two other hair strands determined to be neighbors of a given hair strand are stored in the alpha channel of the given hair strand. The indices may represent vertex positions, such as single point three-dimensional coordinates of the starting and/or ending position of the neighboring hair strands. The indices or references may represent storage locations or sections of the hair float texture 207 that store coordinates of the neighboring hair strands. In some implementations, hair float texture 207 is stored locally on a user device used to generate the display of the hair strands.

A story table 206 stores data regarding collections of messages and associated image, video, or audio data, which are compiled into a collection (e.g., a story or a gallery). The creation of a particular collection may be initiated by a particular user (e.g., each user for which a record is maintained in the entity table 202). A user may create a "personal story" in the form of a collection of content that has been created and sent/broadcast by that user. To this end, the UI of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a UI of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 3:
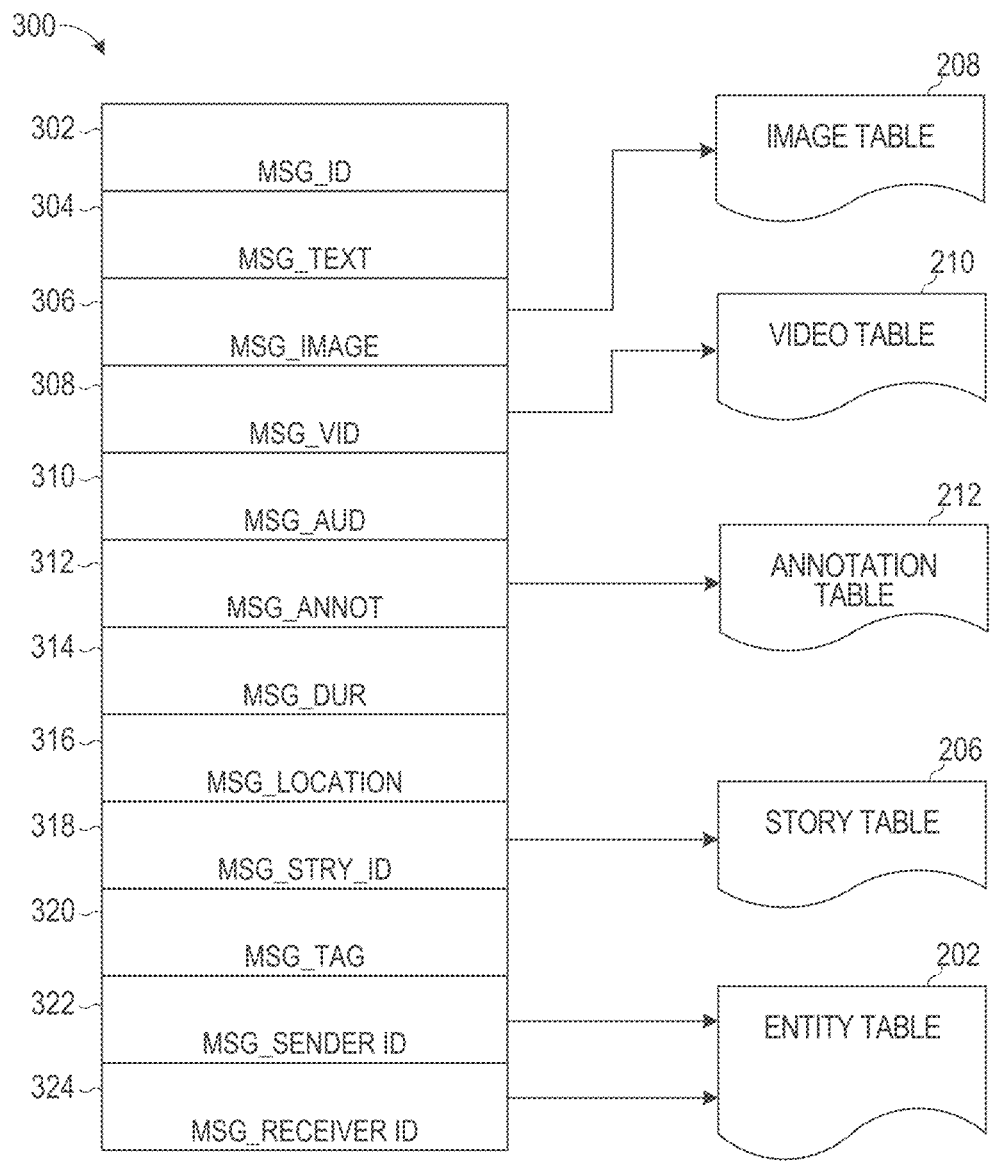
FIG. 3 is a schematic diagram illustrating a structure of a message generated by a messaging client application for communication, according to example embodiments.

FIG. 3 is a schematic diagram illustrating a structure of a message 300, according to some embodiments, generated by a messaging client application 104 for communication to a further messaging client application 104 or the messaging server application 114. The content of a particular message 300 is used to populate the message table 214 stored within the database 120, accessible by the messaging server application 114. Similarly, the content of a message 300 is stored in memory as "in-transit" or "in-flight" data of the client device 102 or the application server 112. The message 300 is shown to include the following components:

A message identifier 302: a unique identifier that identifies the message 300.

A message text payload 304: text, to be generated by a user via a UI of the client device 102 and that is included in the message 300.

A message image payload 306: image data, captured by a camera component of a client device 102 or retrieved from memory of a client device 102, and that is included in the message 300.

A message video payload 308: video data, captured by a camera component or retrieved from a memory component of the client device 102 and that is included in the message 300.

A message audio payload 310: audio data, captured by a microphone or retrieved from the memory component of the client device 102, and that is included in the message 300.

Message annotations 312: annotation data (e.g., filters, stickers, or other enhancements) that represents annotations to be applied to message image payload 306, message video payload 308, or message audio payload 310 of the message 300.

A message duration parameter 314: parameter value indicating, in seconds, the amount of time for which content of the message (e.g., the message image payload 306, message video payload 308, message audio payload 310) is to be presented or made accessible to a user via the messaging client application 104.

A message geolocation parameter 316: geolocation data (e.g., latitudinal and longitudinal coordinates) associated with the content payload of the message. Multiple message geolocation parameter 316 values may be included in the payload, with each of these parameter values being associated with respect to content items included in the content (e.g., a specific image within the message image payload 306, or a specific video in the message video payload 308).

A message story identifier 318: identifier value identifying one or more content collections (e.g., "stories") with which a particular content item in the message image payload 306 of the message 300 is associated. For example, multiple images within the message image payload 306 may each be associated with multiple content collections using identifier values.

A message tag 320: each message 300 may be tagged with multiple tags, each of which is indicative of the subject matter of content included in the message payload. For example, where a particular image included in the message image payload 306 depicts an animal (e.g., a lion), a tag value may be included within the message tag 320 that is indicative of the relevant animal. Tag values may be generated manually, based on user input, or may be automatically generated using, for example, image recognition.

A message sender identifier 322: an identifier (e.g., a messaging system identifier, email address, or device identifier) indicative of a user of the client device 102 on which the message 300 was generated and from which the message 300 was sent.

A message receiver identifier 324: an identifier (e.g., a messaging system identifier, email address, or device identifier) indicative of user(s) of the client device 102 to which the message 300 is addressed. In the case of a conversation between multiple users, the identifier may indicate each user involved in the conversation.

The contents (e.g., values) of the various components of message 300 may be pointers to locations in tables within which content data values are stored. For example, an image value in the message image payload 306 may be a pointer to (or address of) a location within an image table 208. Similarly, values within the message video payload 308 may point to data stored within a video table 210, values stored within the message annotations 312 may point to data stored in an annotation table 212, values stored within the message story identifier 318 may point to data stored in a story table 206, and values stored within the message sender identifier 322 and the message receiver identifier 324 may point to user records stored within an entity table 202.

Figure 4:
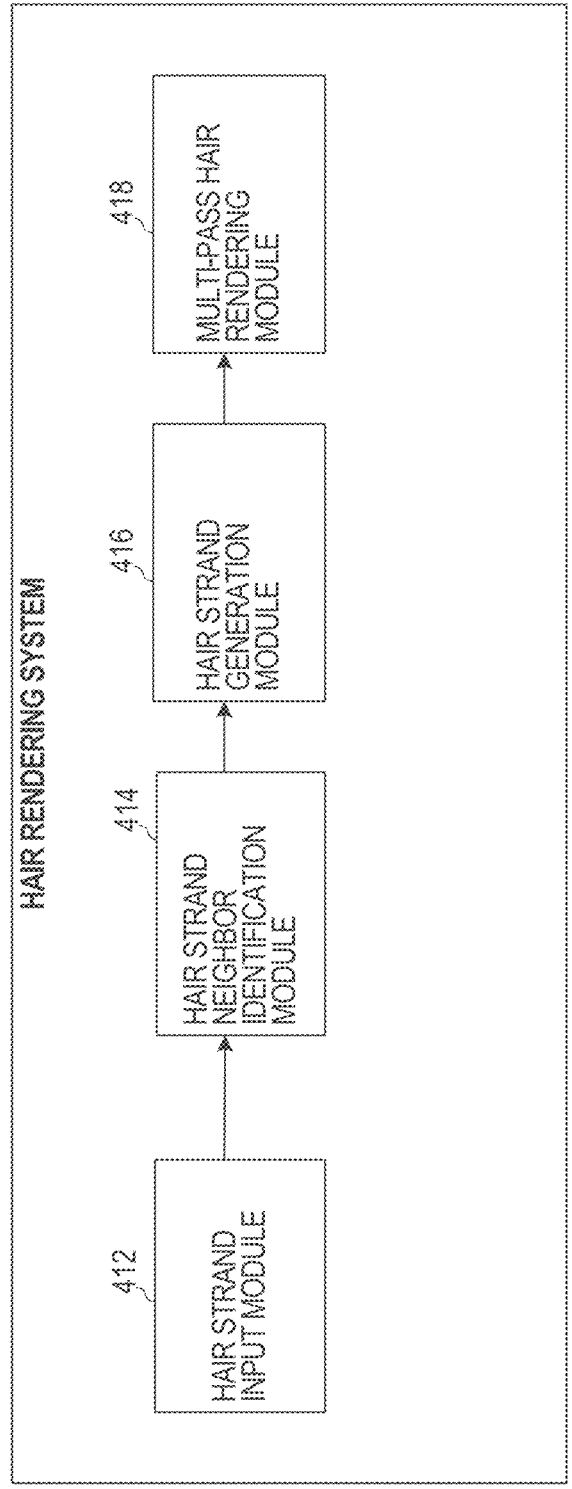
FIG. 4 is a block diagram showing an example hair rendering system, according to example embodiments.

FIG. 4 is a block diagram showing an example hair rendering system 124, according to example embodiments. Any one or more components or combination of components shown in FIG. 4 can be implemented on a user devices used to render a display of the hair strands. Hair rendering system 124 includes a hair strand input module 412, a hair strand neighbor identification module 414, a hair strand generation module 416, and a multi-pass hair rendering module 418. Hair strand input module 412 receives a hair input file from a user that specifies (e.g., in floating point format) the list of curves of each hair strand. In some implementations, this file is created by a designer and provided to users of a messaging client application 104. Once selected, the file is loaded into the hair strand input module 412. In some implementations, a user of the messaging client application 104 generates the hair file that lists the curves for each hair strand and inputs that file to the hair strand input module 412.

The hair strand input module 412 loads the hair input file into storage and stores coordinates for each hair strand into an RGBA (red, green, blue alpha) float texture. The hair strand input module 412 stores in the red, green and blue channel, the X, Y, and Z coordinates, respectively of each point of a spline of a hair strand that is input by the user. The hair strand input module 412 collects spline points and creates groups of hair strands by strand point numbers. In some cases, the hair strand input module 412 processes hair strands with the same point numbers in one pass and provides such hair strands to a simulator for processing together. The RGBA float texture includes multiple sections (in some cases referred to as indices). Each section includes coordinates in red, green, and blue channels of each point of a particular hair strand. Each section may also include indices or references to other hair strands in the alpha channel of the particular hair strand to identify the section which stores the coordinates of the other hair strands.

Figure 7A:
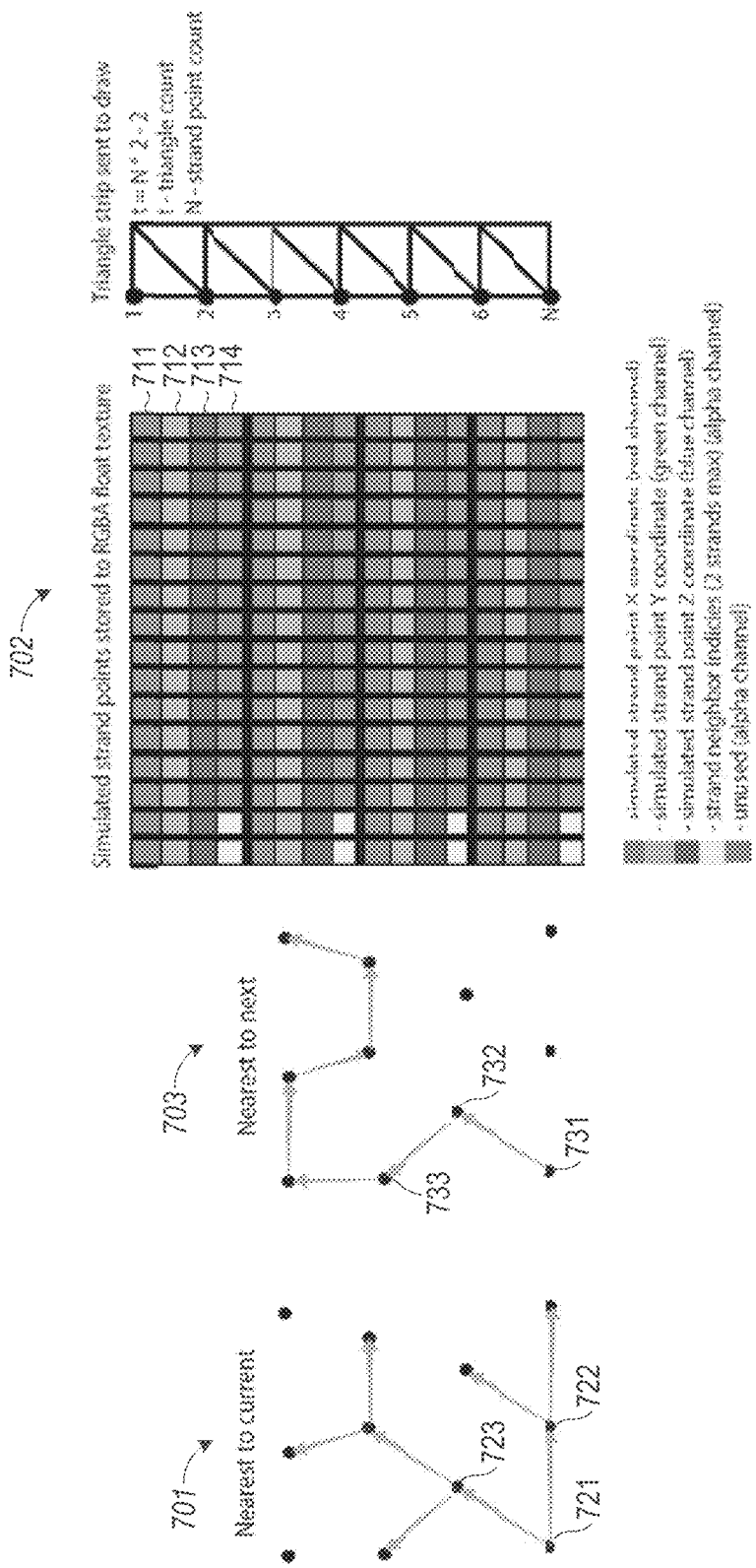
FIGS. 7A, 7B, 8A and 8B are illustrative inputs and outputs of the hair rendering system, according to example embodiments.

The hair strand input module 412 provides the RGBA float texture to the hair strand neighbor identification module 414. The hair strand neighbor identification module 414 processes coordinates of each hair strand to identify one or two neighbor hair strands of each hair strand. Once the one or two neighbor hair strands are identified, the hair strand neighbor identification module 414 stores the vertex points of, indices or, or references to the neighbor hair strands in association with the given hair strand with which they are neighbors. To do so, the hair strand neighbor identification module 414 stores the vertex points, references to, or index points of the neighbor hair strands in the alpha channel of the given hair strand. The index points or references identify the storage locations in the RGBA float texture of the coordinates of the spline points of the neighboring hair strand. As an example, a RGBA float texture 702 that is generated and provided by the hair strand input module 412 is shown in FIG. 7A. RGBA float texture 702 shows coordinates of four different hair strands. The first three rows 711, 712, 713 show the coordinates stored respectively in the red, green and blue channels of the RGBA float texture 702 for a first hair strand. The fourth row 714 shows the alpha channel in which the index points or vertex points of one or two neighbor hair strands identified for the first hair strand.

Figure 7B:
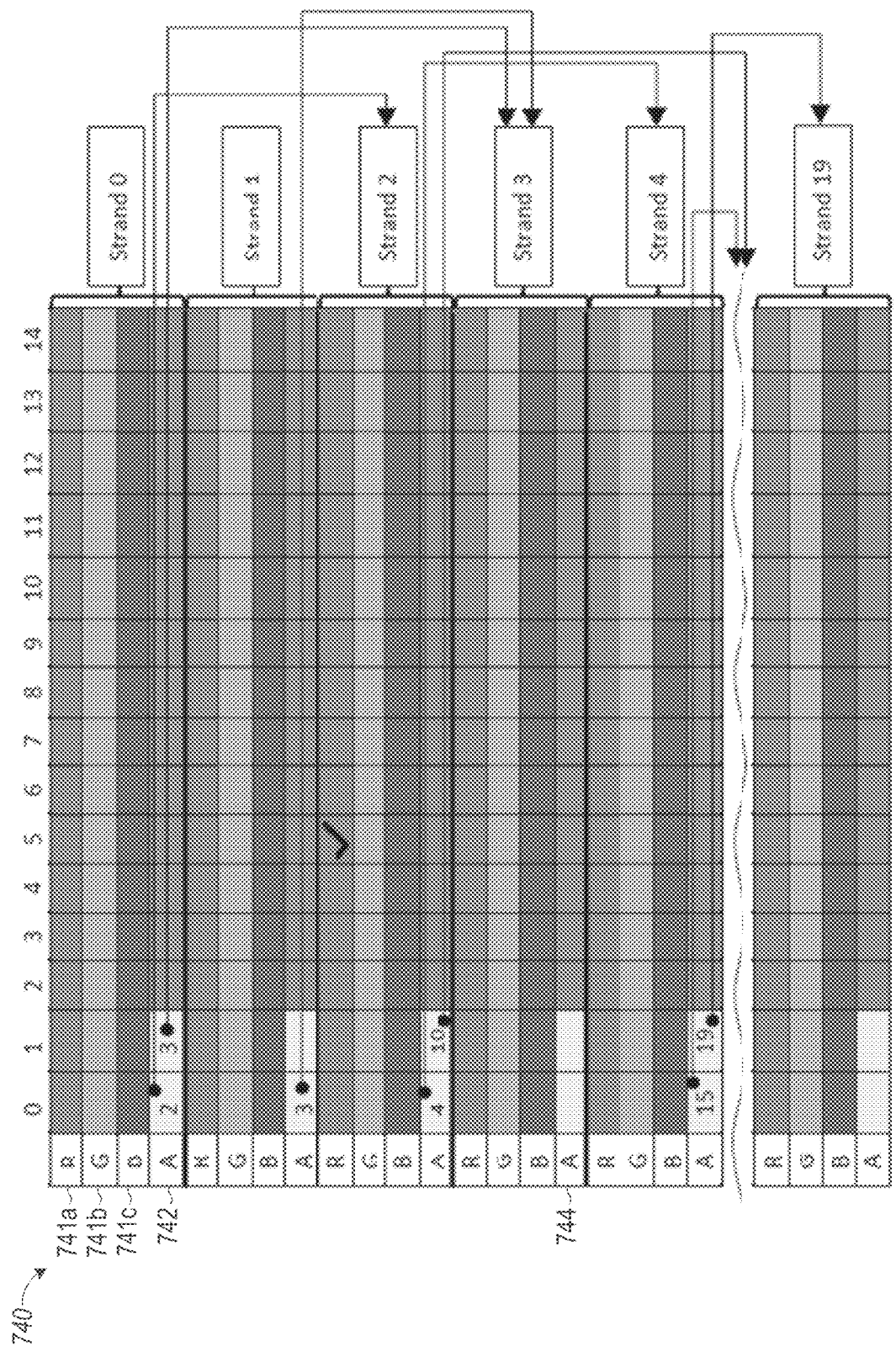

FIG. 7B shows an illustrative RGBA float texture 740 that includes 20 sections representing coordinates of 20 hair strands. As shown, for hair strand 0, the first section 0 includes in the red, green, and blue channels 741a-c, the spline points of the hair strand 0. In addition, two neighbors (hair strand 2 and hair strand 3) may be identified for hair strand 0. As a result, two respective index points or references to the storage locations or sections in the RGBA float texture 740 of hair strands 2 and 3 are stored in the alpha channel 741 of hair strand 0. The index points or references to the storage locations can be used to retrieve the section of the RGBA float texture 740 which stores the coordinates in the red, green, and blue channels in the respective sections of the hair strands. Specifically, the index point 2 identifies the section in the RGBA float texture 740 that stores the coordinates of the spline points of the hair strand 2 in the red, green, and blue channels of hair strand 2. In some cases, no neighbors are associated with a given hair strand and in such cases no index points or references are stored in the alpha channel of the given hair strand. For example, hair strand 3 may not have any neighboring hair strands identified in a particular frame and accordingly no index points or references are stored in the alpha channel 744 of the hair strand 3 alpha channel.

In some embodiments, the RGBA float texture 740 is updated for each frame of video as hair strand spline points change positions. In such cases, the neighboring hair strands may be identified and updated in the RGBA float texture 740 for each video frame.

As an example, the RGBA float texture 740 is used to interpolate additional hair strands between hair strands based on the index or references stored in the alpha channels of each hair strand. Specifically, when strand 0 data is processed, positions of additional hair strands are calculated using multiple hair strand interpolation techniques between hair strand 0, hair strand 2 (referenced in the alpha channel of hair strand 0) and hair strand 3 (referenced in the alpha channel of hair strand 0). For hair strand 1, additional hair strands are interpolated between hair strand 1 and hair strand 3 (referenced in the alpha channel of hair strand 1). For hair strand 2, positions of additional hair strands are calculated between hair strand 2, hair strand 4 (referenced in the alpha channel of hair strand 2) and hair strand 10 (referenced in the alpha channel of hair strand 2). For hair strand 3, additional hair strand generation is performed using a single strand interpolation technique because no neighbor hair strand indices or references are stored in the alpha channel of hair strand 3.

In some implementations, the hair strand neighbor identification module 414 performs a process described in connection with FIG. 6 to identify neighbor hair strands. The hair strand neighbor identification module 414 can identify neighbor hair strands using a nearest to current or nearest to next process. A user can specify whether to identify neighbors using a nearest to current process or the nearest to next process.

When the nearest to current process is selected, a radius that is specified by the user is retrieved. Then, the hair strand neighbor identification module 414 can select to process the first hair strand that is stored in the RGBA float texture 702. Once selected, the hair strand neighbor identification module 414 can search within the specified radius to identify all other hair strands that are stored in the RGBA float texture 702. Specifically, the hair strand neighbor identification module 414 identifies a collection of other hair strands based on their coordinates stored in the RGBA float texture that are within the specified radius of the first hair strand. Once the collection of hair strands is identified, the hair strand neighbor identification module 414 computes a distance between a vertex (or any other point) of the first hair strand and each of the hair strands in the collection. The hair strand neighbor identification module 414 selects two neighboring hair strands in the collection that are closest, based on the computed distance, to the first hair strand than other hair strands in the collection. The hair strand neighbor identification module 414 stores the vertex points, index points of, or references to the two neighboring hair strands that are selected in the alpha channel of the first hair strand. For example, as shown in diagram 701, a nearest to current process is illustrated. In this process, a first hair strand 721 is selected and a collection of hair strands is identified and shown in diagram 701. The hair strand neighbor identification module 414 searches all the hair strands in the collection and determines that two neighboring hair strands 722 and 723 are closer to the first hair strand 721 than all other hair strands in the collection.

The hair strand neighbor identification module 414 repeats the process of identifying neighbor hair strands for each hair strand that is stored in the RGBA float texture 702. For example, the hair strand neighbor identification module 414 selects a second hair strand and searches, using the nearest to current process, for two neighboring hair strands that are closer to the second hair strand than other hair strands in the collection. The hair strand neighbor identification module 414 searches for the two neighboring hair strands relative to the second hair strand within the same radius as previously used to identify the collection. Namely, the collection of hair strands is identified once using the specified radius and the neighboring hair strands are searched for each hair strand within the collection. For example, the hair strand neighbor identification module 414 selects hair strand 723 and identifies two other hair strands in the collection that are closer to hair strand 723 than all other hair strands in the collection. The indices (or references to storage locations) of the two other hair strands are then stored in the alpha channel for hair strand 723.

When the nearest to next process is selected, a radius that is specified by the user is retrieved and used for each hair strand that is selected. Then, the hair strand neighbor identification module 414 can select to process the first hair strand that is stored in the RGBA float texture 702. Once selected, the hair strand neighbor identification module 414 can search within the specified radius to identify all other hair strands that are stored in the RGBA float texture 702. Specifically, the hair strand neighbor identification module 414 identifies a collection of other hair strands based on their coordinates stored in the RGBA float texture that are within the specified radius of the first hair strand. Once the collection of hair strands is identified, the hair strand neighbor identification module 414 computes a distance between a vertex (or any other point) of the first hair strand and each of the hair strands in the collection. The hair strand neighbor identification module 414 selects one of the neighboring hair strands in the collection that is closest, based on the computed distance, to the first hair strand than other hair strands in the collection. The hair strand neighbor identification module 414 stores the index points of or references to the neighboring hair strand that is selected in the alpha channel of the first hair strand.

The hair strand neighbor identification module 414 repeats this process by creating a new collection of hair strands that is within a radius of a selected hair strand. For example, as shown in diagram 703, a nearest to next process is illustrated. In this process, a first hair strand 731 is selected and a collection of hair strands is identified and shown in diagram 703. The hair strand neighbor identification module 414 searches all the hair strands in the collection and determines that neighboring hair strand 732 is closer to the first hair strand 731 than all other hair strands in the collection. The hair strand 732 is stored in association with the first hair strand 731. Then, the hair strand 732 is selected and a collection of hair strands is identified and shown in diagram 703 that is within a radius of the hair strand 732. The hair strand neighbor identification module 414 searches all the hair strands in the collection and determines that neighboring hair strand 733 is closer to the second hair strand 732 than all other hair strands in the collection. The index of or reference to hair strand 733 is stored in association with the second hair strand 732.

In some embodiments, in both the nearest to current and the nearest to next process, once one or two neighboring hair strands that are determined to be closer to the first hair strand than other hair strands in the collection are selected, the hair strand neighbor identification module 414 can compute an angle between each of the two neighboring hair strands and the first hair strand. Specifically, the hair strand neighbor identification module 414 can retrieve the coordinates of a first of the two neighboring hair strands from the red, green, and blue channel of the first of the two neighboring hair strands stored in the RGBA float texture 720. The hair strand neighbor identification module 414 computes an angle between the first hair strand and the first of the two neighboring hair strands. If the computed angle is less than a threshold, the first of the two neighboring hair strands can remain stored in association with the first hair strand. If the computed angle is greater than the threshold, the hair strand neighbor identification module 414 prevents the index of or reference to the first of the two neighboring hair strands from being stored in the alpha channel of the first hair strand. In such cases, assuming the second of the two neighboring hair strands is at an angle that is less than the threshold of the first hair strand, only the index of or reference to the second of the two neighboring hair strands is stored in association with the first hair strand in the alpha channel of the first hair strand.

The hair strand neighbor identification module 414 provides the RGBA float texture to the hair strand generation module 416. The hair strand generation module 416 processes the RGBA float texture and simulates or generates additional hair strands between a given hair strand that is stored in the RGBA float texture and one or two neighbor hair strands, whose indices or references are stored in the alpha channel for the given hair strand. To do so, the hair strand generation module 416 performs single strand or multi-strand interpolation between the coordinates of the given hair strand in the RGBA float texture and the coordinates stored in the storage location identified by the index or reference of the one or two neighboring hair strands stored in the alpha channel of the given hair strand.

In the case of single strand interpolation, the hair strand generation module 416 generates additional strands around a base strand within a specified radius (e.g., a radius input by a user). Single strand interpolation can be used when a given hair strand in the RGBA float texture does not have any neighboring hair strands stored in the alpha channel of the given hair strand (e.g., the alpha channel of the given hair strand is empty). In the case of multi-strand interpolation, additional hair strands are generated between a given hair strand and one or two neighboring hair strands identified by the index or reference stored in the alpha channel of the given hair strand. To do so, a triangle having three edges is formed by connecting the vertex points of the base hair strand (e.g., the coordinates stored in the red, green, and blue channel of the given hair strand) and the vertex positions of each of two neighboring hair strands stored in the alpha channel of the base hair strand. Once the triangle is formed, additional hair strands are generated by interpolation within the confines of the triangle edges.

The hair strand generation module 416 populates the additional hair strands that are generated by interpolation into the RGBA float texture and provides this updated RGBA float texture to the multi-pass hair rendering module 418. The multi-pass hair rendering module 418 processes the RGBA float texture and renders a visual representation of the hair by creating triangles. An illustrative triangle strip is shown in FIG. 7A. To avoid creation of many triangles, the multi-pass hair rendering module 418 uses instanced drawing, which creates a single triangle strip on initialization (e.g., hairstyle may have strands with maximum 25 points number in which case the triangle strip is created with 50 vertices and 48 triangles). This triangle strip is created and drawn only once per frame, which keeps memory usage low and allows a great number of triangles to be created fast. The hair strand points including the generated hair strands are read, every frame of a video, and transformed to simulated strand point positions in a visual model. The multi-pass hair rendering module 418 renders hair on an object (e.g., a human head or an animal or some other object depicted in a video or image) in three or four passes for each frame or image.

Figure 8A:
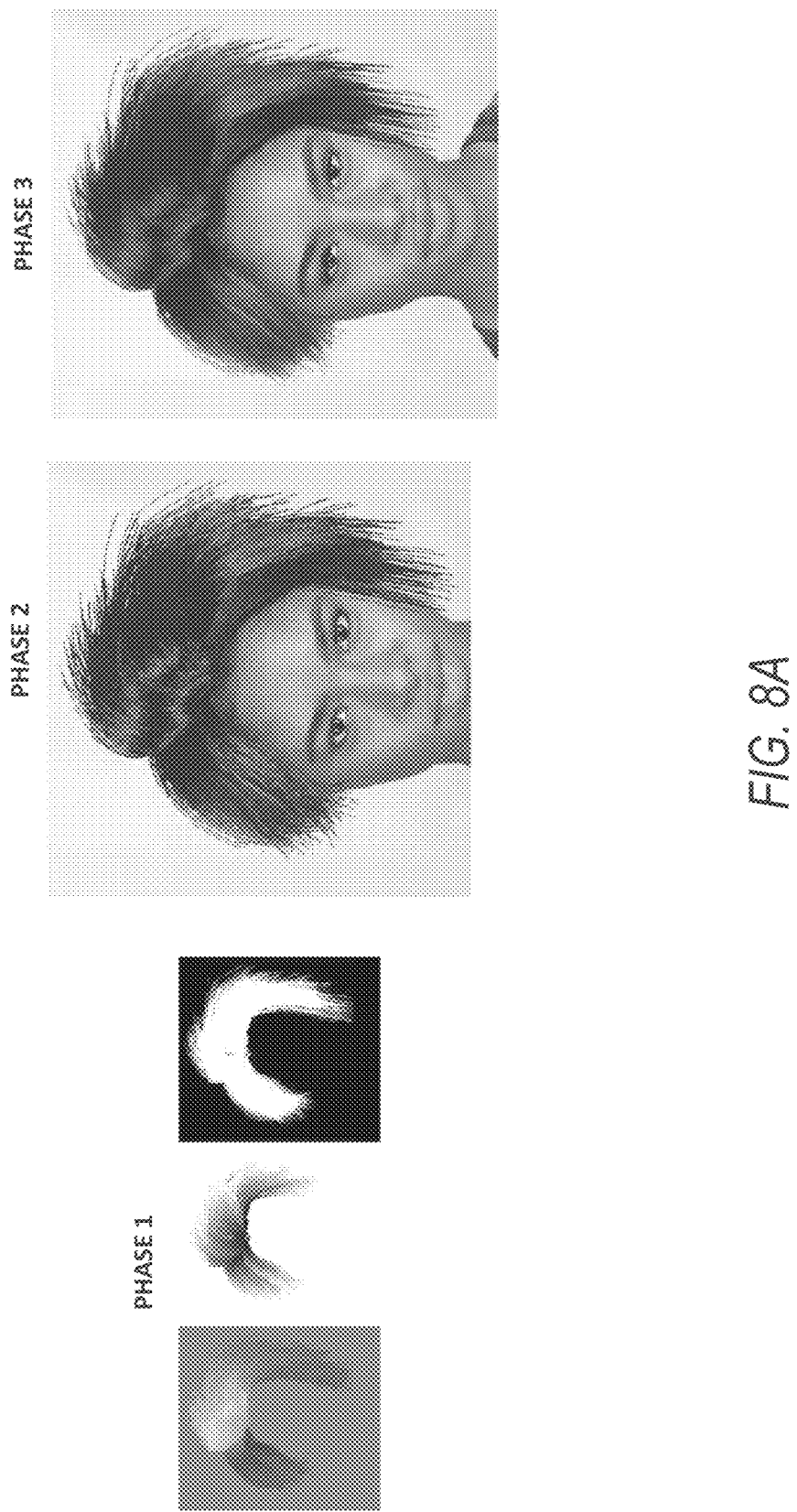

FIG. 8A is a diagram illustrating a three pass approach. In a first pass (phase 1) of the three passes: multi-pass hair rendering module 418 generates a geometry of the hair using the hair spline data and the additional hair strands that are stored in the RGBA float texture. The multi-pass hair rendering module 418 computes strand tangent directions for each hair strand in the RGBA float texture. Specifically, the multi-pass hair rendering module 418 generates a vector that indicates a direction between each pair of points of the spline that corresponds to each hair strand. Namely, the multi-pass hair rendering module 418 retrieves coordinates of a given hair strand and computes a vector between each pair of points that form the given hair strand. These vectors that connect each pair of points are stored in a red and green channel for each hair strand of the plurality of hair strands and the additional hair strands that have been generated. The multi-pass hair rendering module 418 stores hair color luminance of each hair strand in a blue channel and stores a one bit transparency of each hair strand in an alpha channel. In a second pass (phase 2) of the three passes, a screen quad is rendered based on the geometry, the blue channel, and the alpha channel. In a third pass (phase 3) of the three passes, a one-dimensional Gaussian blur is performed on the screen quad along the strand tangent directions stored in the red and green channels.

Figure 8B:
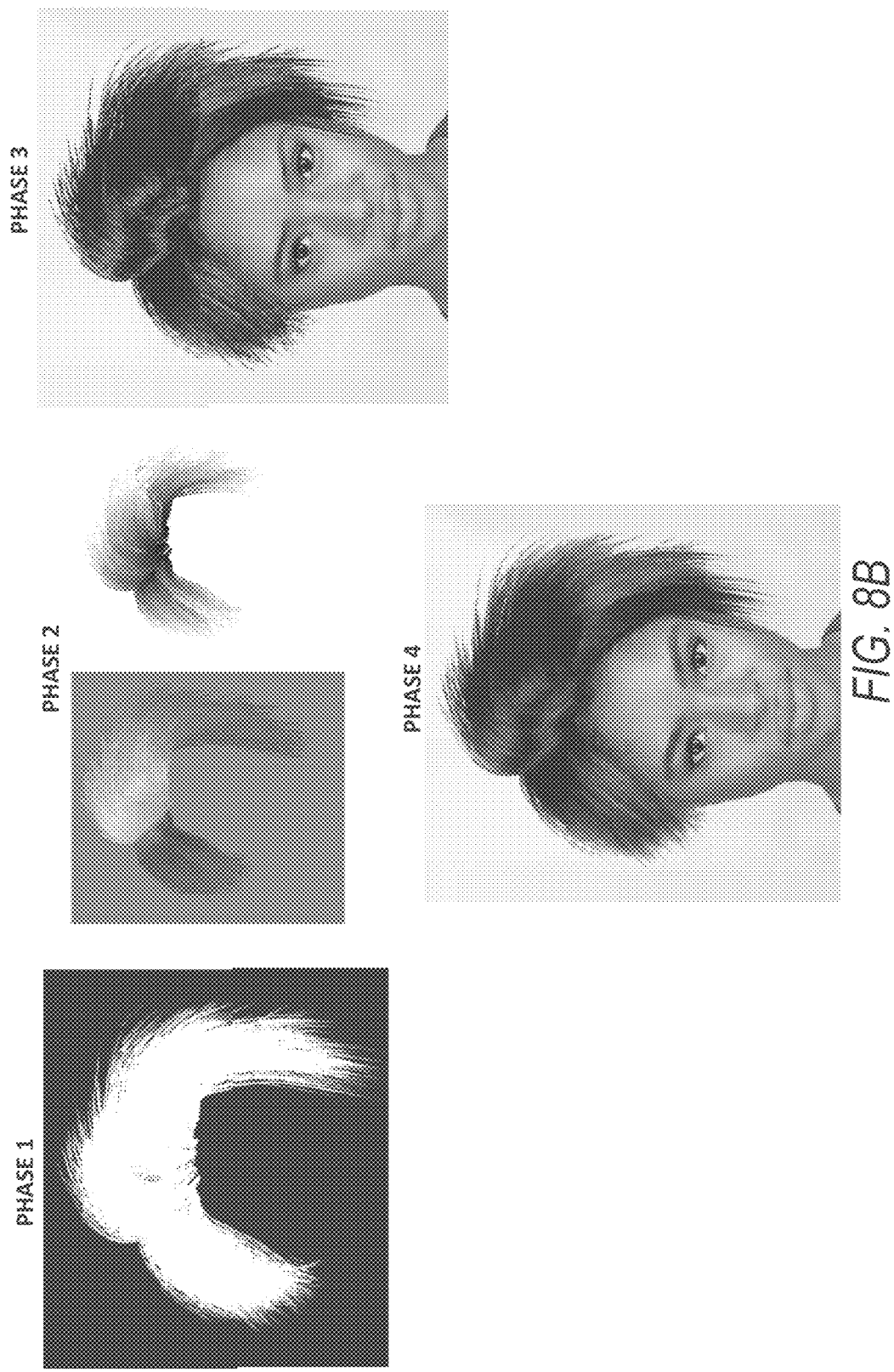

FIG. 8B is a diagram illustrating a three pass approach. In a first pass (phase 1) of the four passes: multi-pass hair rendering module 418 generates a geometry of the hair using the hair spline data and the additional hair strands that are stored in the RGBA float texture. The multi-pass hair rendering module 418 stores an alpha color mask with additive blending in an alpha channel for each hair strand. In a second pass (phase 2) of the four passes: strand tangent directions are computed (in a similar manner as discussed above in connection with FIG. 8A) and stored in a red and green channel for each hair strand. In the second pass, the multi-pass hair rendering module 418 also stores hair color luminance in a blue channel for each hair strand. In a third pass (phase 3) of the four passes, multi-pass hair rendering module 418 renders a screen quad based on the geometry of the hair, the blue channel, and the alpha channel. In a fourth pass (phase 4) of the four passes, a one-dimensional Gaussian blur is performed on the screen quad along the strand tangent directions stored in the red and green channels.

Figure 5:
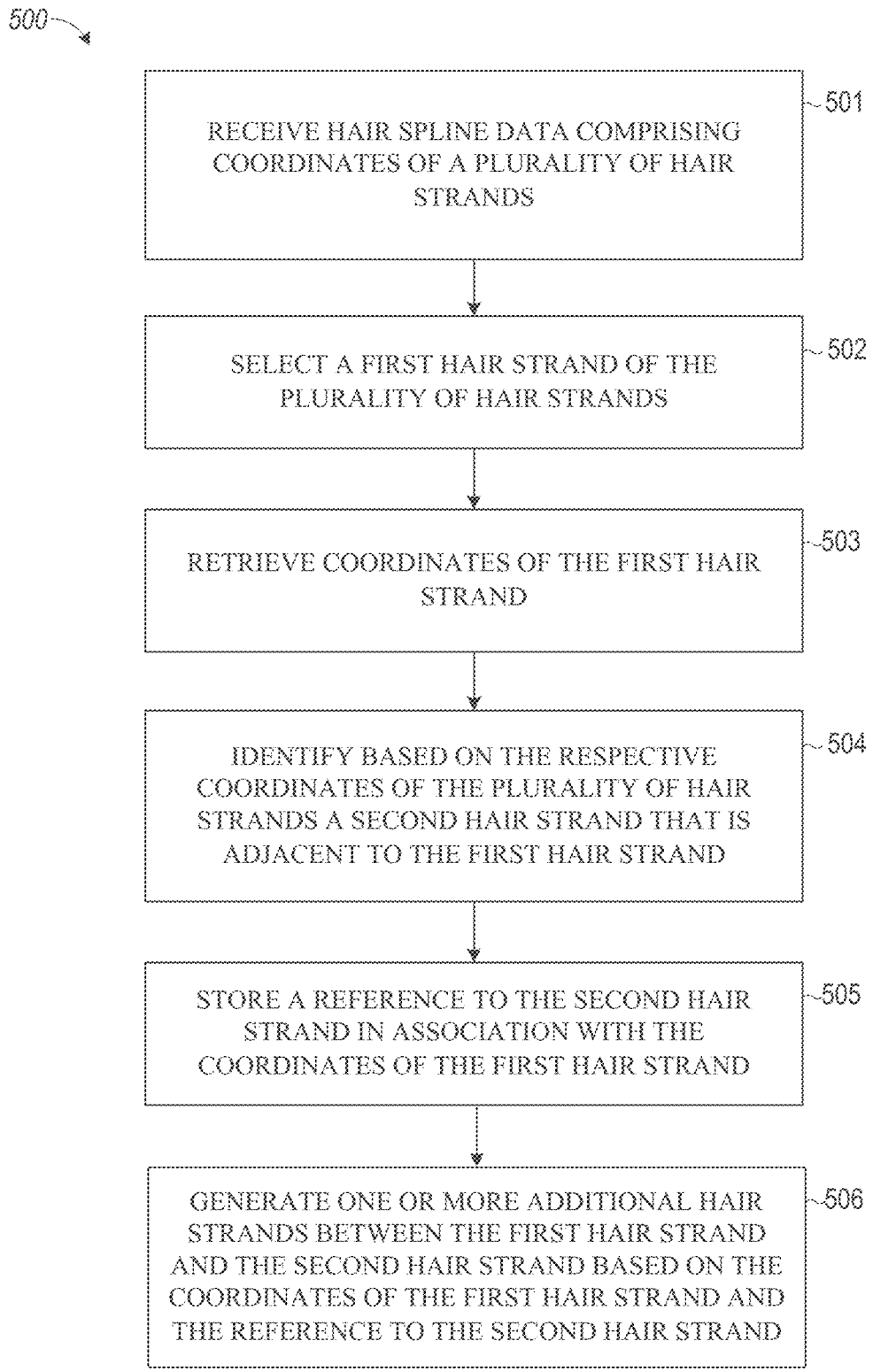
FIGS. 5 and 6 are flowcharts illustrating example operations of the hair rendering system, according to example embodiments.

FIG. 5 is a flowchart illustrating example operations of the hair rendering system 124 in performing process 500, according to example embodiments. The process 500 may be embodied in computer-readable instructions for execution by one or more processors such that the operations of the process 500 may be performed in part or in whole by the functional components of the messaging server system 108 and/or third-party application 105; accordingly, the process 500 is described below by way of example with reference thereto. However, in other embodiments, at least some of the operations of the process 500 may be deployed on various other hardware configurations. The process 500 is therefore not intended to be limited to the messaging server system 108 and can be implemented in whole, or in part, by any other component. Some or all of the operations of process 500 can be in parallel, out of order, or entirely omitted.

At operation 501, the hair rendering system 124 receives hair spline data comprising coordinates of a plurality of hair strands.

At operation 502, the hair rendering system 124 selects a first hair strand of the plurality of hair strands.

At operation 503, the hair rendering system 124 retrieves coordinates of the first hair strand.

At operation 504, the hair rendering system 124 identifies, based on the respective coordinates of the plurality of hair strands, a second hair strand that is adjacent to the first hair strand.

At operation 505, the hair rendering system 124 stores a reference to the second hair strand in association with the coordinates of the first hair strand.

At operation 506, the hair rendering system 124 generates one or more additional hair strands between the first hair strand and the second hair strand based on the coordinates of the first hair strand and the reference to the second hair strand.

Figure 6:
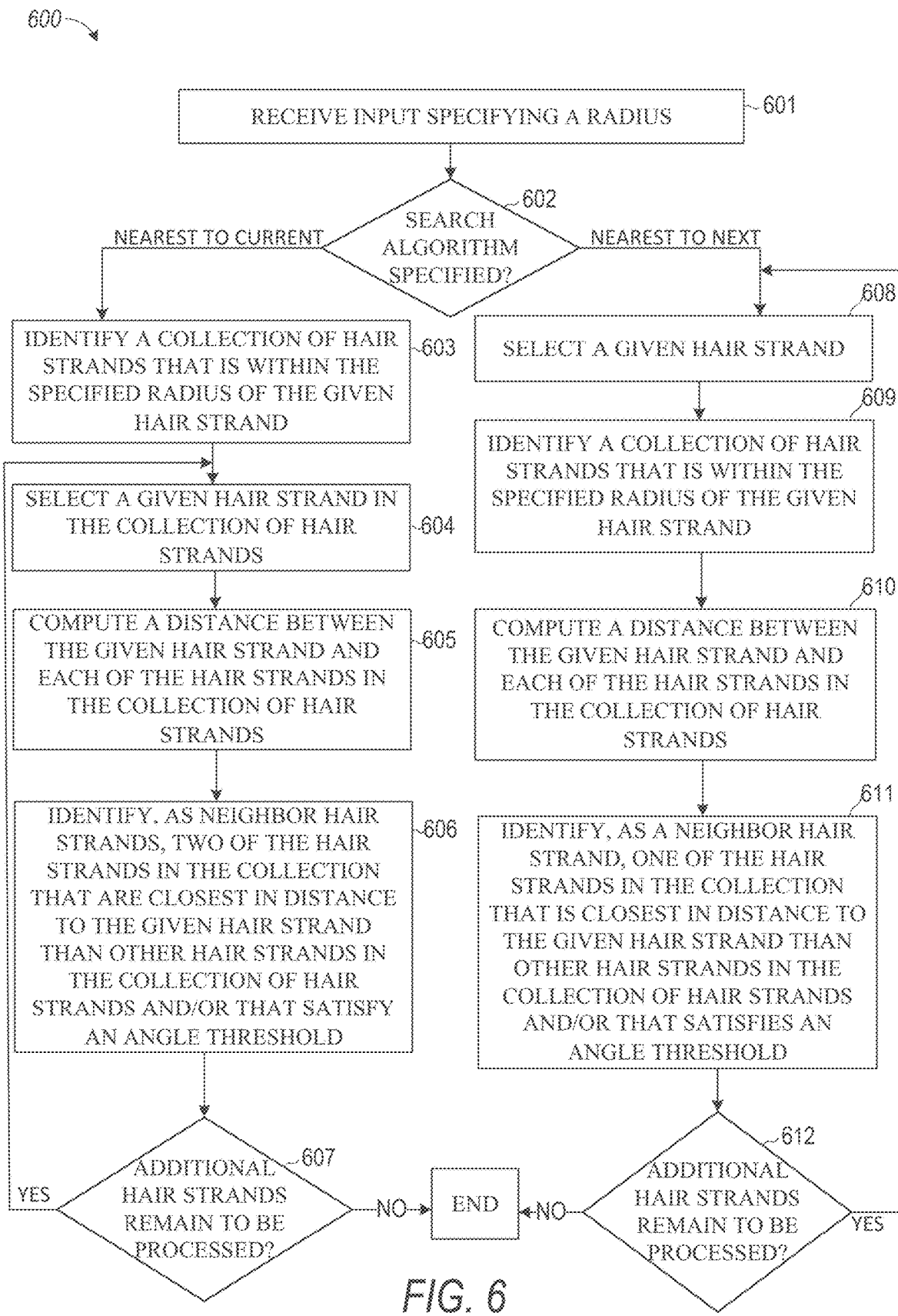

FIG. 6 is a flowchart illustrating example operations of the hair rendering system 124 in performing process 600, according to example embodiments. The process 600 may be embodied in computer-readable instructions for execution by one or more processors such that the operations of the process 600 may be performed in part or in whole by the functional components of the messaging server system 108 and/or third-party application 105; accordingly, the process 600 is described below by way of example with reference thereto. However, in other embodiments, at least some of the operations of the process 600 may be deployed on various other hardware configurations. The process 600 is therefore not intended to be limited to the messaging server system 108 and can be implemented in whole, or in part, by any other component. Some or all of the operations of process 600 can be in parallel, out of order, or entirely omitted.

At operation 601, the hair rendering system 124 receives inputs specifying a radius.

At operation 602, the hair rendering system 124 determines what type of search algorithm is specified. In response to determining that a nearest to current search algorithm is specified, the hair rendering system 124 proceeds to operation 603. In response to determining that a nearest to next search algorithm is specified, the hair rendering system 124 proceeds to operation 608.

At operation 603, the hair rendering system 124 identifies a collection of hair strands that is within the specified radius of the given hair strand.

At operation 604, the hair rendering system 124 selects a given hair strand in the collection of hair strands.

At operation 605, the hair rendering system 124 computes a distance between the given hair strand and each of the hair strands in the collection of hair strands.

At operation 606, the hair rendering system 124 identifies, as neighbor hair strands, two of the hair strands in the collection that are closest in distance to the given hair strand than other hair strands in the collection of hair strands and/or that satisfy an angle threshold.

At operation 607, the hair rendering system 124 determines if additional hair strands remain to be processed and if so, the hair rendering system 124 proceeds to operation 604. Otherwise, the hair rendering system 124 ends the process.

At operation 608, the hair rendering system 124 selects a given hair strand.

At operation 609, the hair rendering system 124 identifies a collection of hair strands that is within the specified radius of the given hair strand.

At operation 610, the hair rendering system 124 computes a distance between the given hair strand and each of the hair strands in the collection of hair strands.

At operation 611, the hair rendering system 124 identifies, as a neighbor hair strand, one of the hair strands in the collection that is closest in distance to the given hair strand than other hair strands in the collection of hair strands and/or that satisfies an angle threshold.

At operation 612, the hair rendering system 124 determines if additional hair strands remain to be processed and if so, the hair rendering system 124 proceeds to operation 608. Otherwise, the hair rendering system 124 ends the process.

Figure 9:
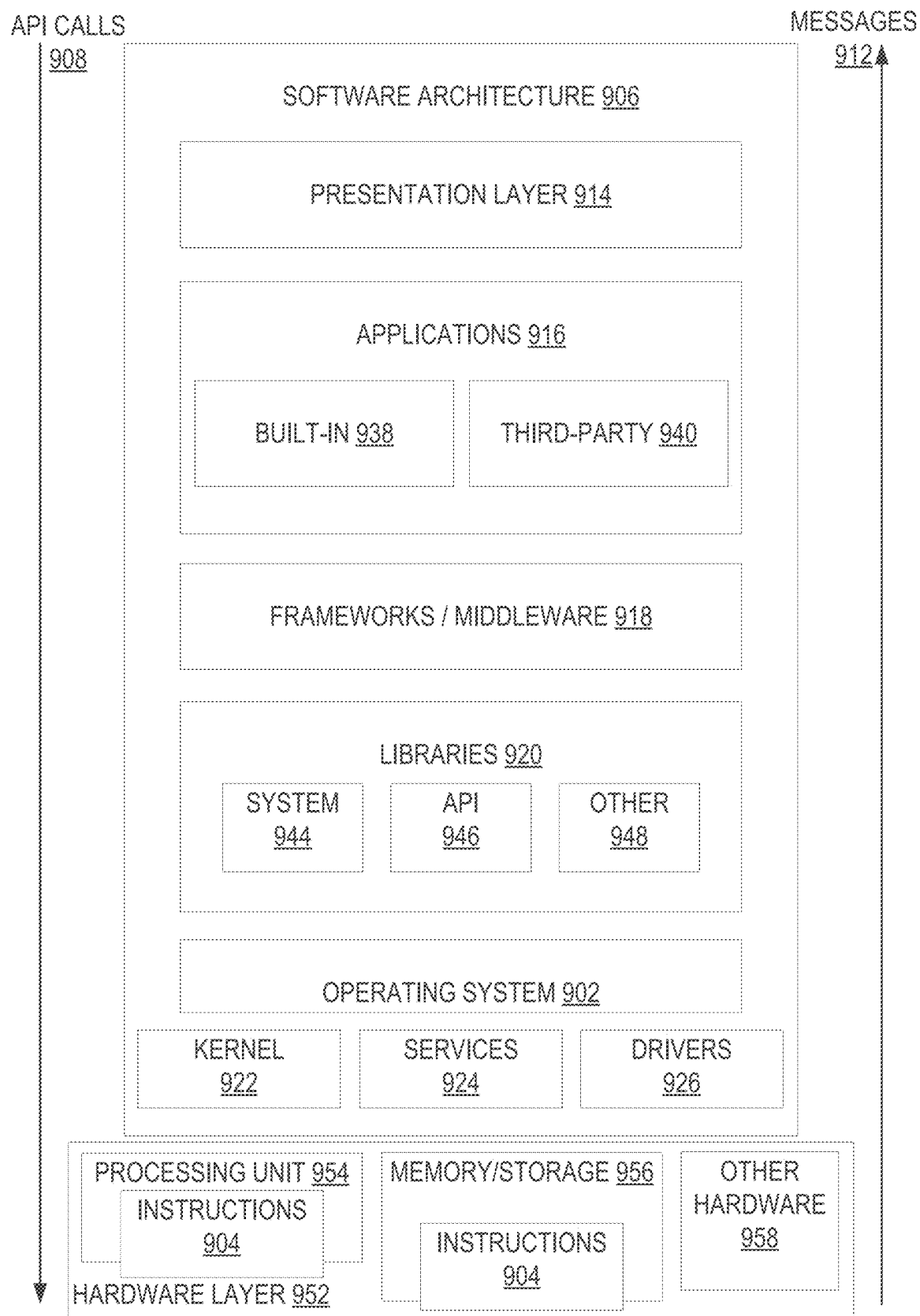
FIG. 9 is a block diagram illustrating a representative software architecture, which may be used in conjunction with various hardware architectures herein described, according to example embodiments.

FIG. 9 is a block diagram illustrating an example software architecture 906, which may be used in conjunction with various hardware architectures herein described. FIG. 9 is a non-limiting example of a software architecture and it will be appreciated that many other architectures may be implemented to facilitate the functionality described herein. The software architecture 906 may execute on hardware such as machine 1000 of FIG. 10 that includes, among other things, processors 1004, memory 1014, and input/output (I/O) components 1018. A representative hardware layer 952 is illustrated and can represent, for example, the machine 1000 of FIG. 10. The representative hardware layer 952 includes a processing unit 954 having associated executable instructions 904. Executable instructions 904 represent the executable instructions of the software architecture 906, including implementation of the methods, components, and so forth described herein. The hardware layer 952 also includes memory and/or storage modules memory/storage 956, which also have executable instructions 904. The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, frameworks/middleware 918, applications 916, and a presentation layer 914. Operationally, the applications 916 and/or other components within the layers may invoke API calls 908 through the software stack and receive messages 912 in response to the API calls 908. The layers illustrated are representative in nature and not all software architectures have all layers. For example, some mobile or special purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 920 provide a common infrastructure that is used by the applications 916 and/or other components and/or layers. The libraries 920 provide functionality that allows other software components to perform tasks in an easier fashion than to interface directly with the underlying operating system 902 functionality (e.g., kernel 922, services 924 and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media format such as MPREG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphic user interface functions, high-level resource management, high-level location services, and so forth. The frameworks/middleware 918 may provide a broad spectrum of other APIs that may be utilized by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. Third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as operating system 902) to facilitate functionality described herein.

The applications 916 may use built-in operating system functions (e.g., kernel 922, services 924, and/or drivers 926), libraries 920, and frameworks/middleware 918 to create UIs to interact with users of the system. Alternatively, or additionally, in some systems, interactions with a user may occur through a presentation layer, such as presentation layer 914.

In these systems, the application/component "logic" can be separated from the aspects of the application/component that interact with a user.

Figure 10:
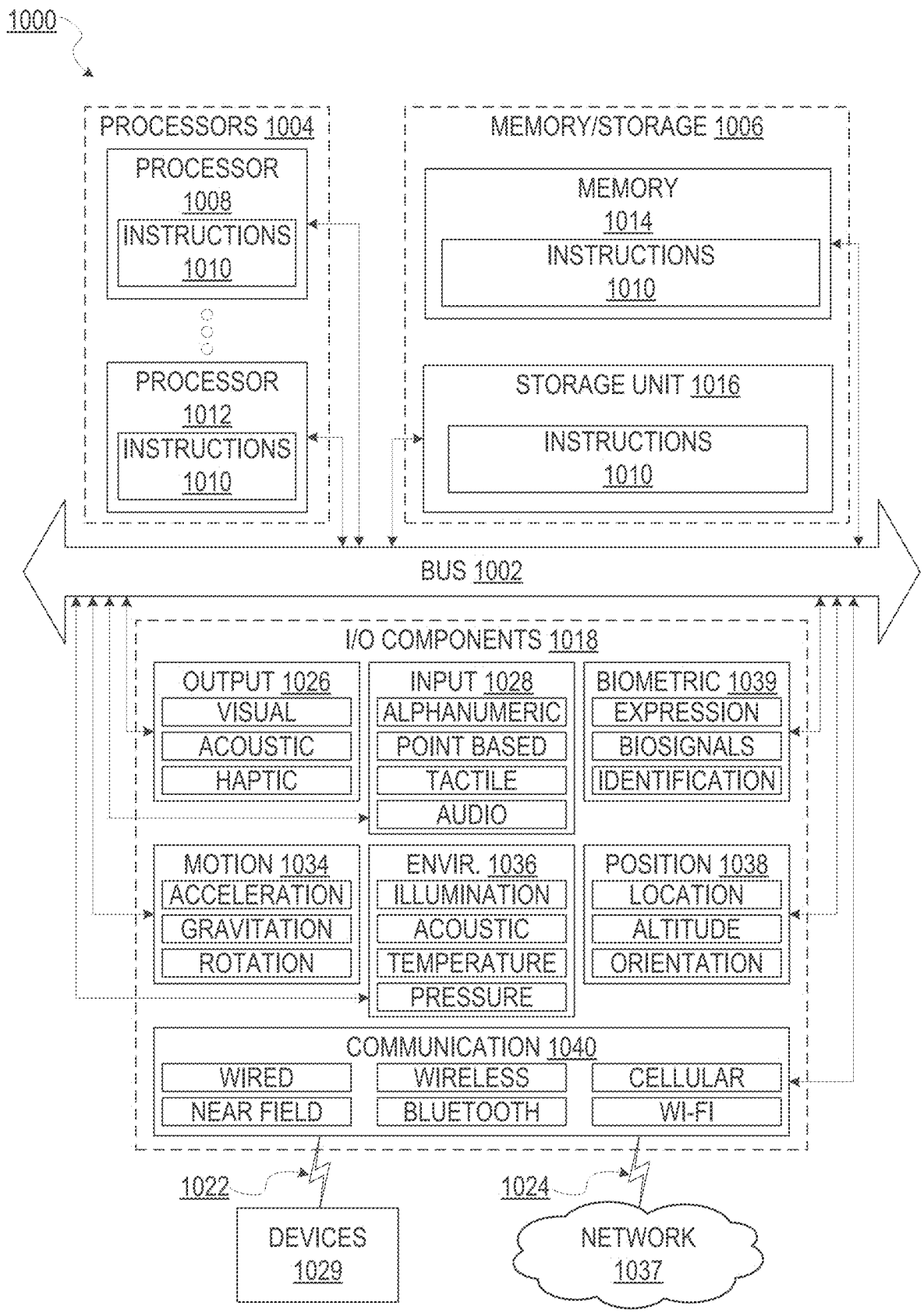
FIG. 10 is a block diagram illustrating components of a machine able to read instructions from a machine-readable medium (e.g., a machine-readable storage medium) and perform any one or more of the methodologies discussed herein, according to example embodiments.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory/storage 1006, and I/O components 1018, which may be configured to communicate with each other such as via a bus 1002. In an example embodiment, the processors 1004 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1008 and a processor 1012 that may execute the instructions 1010. The term "processor" is intended to include multi-core processors 1004 that may comprise two or more independent processors (sometimes referred to as "cores") that may execute instructions contemporaneously. Although FIG. 10 shows multiple processors 1004, the machine 1000 may include a single processor with a single core, a single processor with multiple cores (e.g., a multi-core processor), multiple processors with a single core, multiple processors with multiple cores, or any combination thereof.

The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1039, motion components 1034, environmental components 1036, or position components 1038 among a wide array of other components. For example, the biometric components 1039 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environmental components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1038 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1037 or devices 1029 via coupling 1024 and coupling 1022, respectively. For example, the communication components 1040 may include a network interface component or other suitable device to interface with the network 1037. In further examples, communication components 1040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1029 may be another machine or any of a wide variety of peripheral devices (e.g., a peripheral device coupled via a USB).

Moreover, the communication components 1040 may detect identifiers or include components operable to detect identifiers. For example, the communication components 1040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying transitory or non-transitory instructions for execution by the machine, and includes digital or analog communications signals or other intangible medium to facilitate communication of such instructions. Instructions may be transmitted or received over the network using a transitory or non-transitory transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
receiving, by one or more processors, a digital representation of a three-dimensional (3D) object comprising a surface having a plurality of strands of hair of the object;
selecting, by the one or more processors, a first strand of the plurality of strands;
identifying, by the one or more processors, at least one additional strand that is adjacent to the first strand;
analyzing, by the one or more processors, an attribute of each of the identified at least one additional strand to determine whether each of the at least one additional strand satisfies a predetermined criterion, the predetermined criterion comprising an angle formed between the first strand and each of the at least one additional strand transgressing a threshold; and
in response to determining that the at least one additional strand satisfies the predetermined criterion, generating, by the one or more processors, one or more additional strands between the first strand and the at least one additional strand.

2. The method of claim 1, further comprising receiving spline data comprising coordinates of the plurality of strands.

3. The method of claim 1, further comprising:
retrieving coordinates of the first strand;
identifying, based on respective coordinates of the plurality of strands, a second strand that is adjacent to the first strand; and
storing a reference to the second strand in association with the coordinates of the first strand.

4. The method of claim 1, wherein the one or more additional strands are generated based on coordinates of the first strand and a reference to a second strand.

5. The method of claim 1, further comprising:
receiving input specifying a radius; and
identifying a collection of strands that is within the specified radius of the first strand.

6. The method of claim 1, further comprising:
searching coordinates of the plurality of strands, based on coordinates of the first strand, to identify a third strand of the plurality of strands that is adjacent to the first strand; and
storing a reference to the third strand in association the coordinates of the first strand.

7. The method of claim 6, wherein the searching comprises:
receiving input specifying a radius;
identifying a collection of strands that is within the specified radius of the first strand;
computing a distance between the first strand and each of the strands in the collection of strands; and
identifying, as a second strand and the third strand, two of the strands in the collection that are closest in distance to the first strand than other strands in the collection of strands.

8. The method of claim 1, wherein coordinates of the plurality of strands are stored in a floating texture comprising a red channel, a green channel, a blue channel, and an alpha channel for each of the plurality of strands, wherein 3D coordinates of the first strand are stored in the red, green, and blue channels of the first strand, and wherein a reference to a second strand is stored in the alpha channel of the first strand.

9. The method of claim 1, further comprising:
determining that an additional angle between the first strand and a third strand exceeds the threshold; and
preventing a reference to the third strand from being stored in association with coordinates of the first strand in response to determining that the additional angle exceeds the threshold.

10. The method of claim 1, wherein generating the additional strands comprises performing single strand or multi-strand interpolation, wherein single strand interpolation is performed instead of multi-strand interpolation in response to determining that coordinates of a given strand are not associated with other strands.

11. The method of claim 1, wherein:
in a first pass of three passes:
a geometry is generated using the additional strands;
strand tangent directions are computed and stored in a red and green channel for each strand of the plurality of strands and the additional strands that have been generated;
color luminance is stored in a blue channel for each strand of the plurality of strands and the additional strands that have been generated; and
a one bit transparency is stored in an alpha channel for each strand of the plurality of strands and the additional strands that have been generated;
in a second pass of the three passes, a screen quad is rendered based on the geometry, the blue channel, and the alpha channel; and
in a third pass of the three passes, a one-dimensional Gaussian blur is performed on the screen quad along the strand tangent directions stored in the red and green channels.

12. The method of claim 1, wherein:
in a first pass of four passes:
a geometry is generated using the additional strands; and
an alpha color mask with additive blending is stored in an alpha channel for each strand of the plurality of strands and the additional strands that have been generated;
in a second pass of the four passes:
strand tangent directions are computed and stored in a red and green channel for each strand of the plurality of strands and the additional strands that have been generated; and
color luminance is stored in a blue channel for each strand of the plurality of strands and the additional strands that have been generated;
in a third pass of the four passes, a screen quad is rendered based on the geometry, the blue channel, and the alpha channel; and
in a fourth pass of the four passes, a one-dimensional Gaussian blur is performed on the screen quad along the strand tangent directions stored in the red and green channels.

13. The method of claim 1, wherein a number of additional strands that are generated is selected by a user input.

14. The method of claim 1, further comprising:
determining whether resources of a device satisfy minimum resource constraints; and
in response to determining that the resources of the device satisfy the minimum resource constraints, rendering a display simulating different strand groups in the plurality of strands and the additional strands.

15. The method of claim 1, further comprising:
determining whether resources of a device satisfy minimum resource constraints; and
in response to determining that the resources of the device fail to satisfy the minimum resource constraints, rendering a display based on a static geometry generated based on the plurality of strands and the additional strands.

16. A system comprising:
at least one processor configured to perform operations comprising:
receiving a digital representation of a three-dimensional (3D) object comprising a surface having a plurality of strands of hair of the object;
selecting a first strand of the plurality of strands;
identifying at least one additional strand that is adjacent to the first strand;
analyzing an attribute of each of the identified at least one additional strand to determine whether each of the at least one additional strand satisfies a predetermined criterion, the predetermined criterion comprising an angle formed between the first strand and each of the at least one additional strand transgressing a threshold; and
in response to determining that the at least one additional strand satisfies the predetermined criterion, generating one or more additional strands between the first strand and the at least one additional strand.

17. The system of claim 16, wherein the operations further comprise receiving spline data comprising coordinates of the plurality of strands.

18. The system of claim 16, wherein the operations further comprise:
retrieving coordinates of the first strand;
identifying, based on respective coordinates of the plurality of strands, a second strand that is adjacent to the first strand; and
storing a reference to the second strand in association with the coordinates of the first strand.

19. The system of claim 16, wherein the one or more additional strands are generated based on coordinates of the first strand and a reference to a second strand.

20. A non-transitory machine-readable storage medium that includes instructions that, when executed by at least one processor of a machine, cause the machine to perform operations comprising:
receiving a digital representation of a three-dimensional (3D) object comprising a surface having a plurality of strands of hair of the object;
selecting a first strand of the plurality of strands;
identifying at least one additional strand that is adjacent to the first strand;
analyzing an attribute of each of the identified at least one additional strand to determine whether each of the at least one additional strand satisfies a predetermined criterion, the predetermined criterion comprising an angle formed between the first strand and each of the at least one additional strand transgressing a threshold; and
in response to determining that the at least one additional strand satisfies the predetermined criterion, generating one or more additional strands between the first strand and the at least one additional strand.

* * * * *